United States Patent [19]

Briggs

[11] Patent Number: 4,564,920

[45] Date of Patent: Jan. 14, 1986

[54] MULTIPLIER WITH HYBRID REGISTER

[75] Inventor: Willard S. Briggs, Carrollton, Tex.

[73] Assignee: Mostek Corporation, Carrollton, Tex.

[21] Appl. No.: 446,104

[22] Filed: Dec. 2, 1982

[51] Int. Cl.[4] .............................................. G06F 7/52
[52] U.S. Cl. .................................... 364/757; 364/900
[58] Field of Search ............................... 364/754–757, 364/900 MS File

[56] References Cited

U.S. PATENT DOCUMENTS

| | | | |
|---|---|---|---|
| 3,539,791 | 11/1970 | Herger et al. | 364/755 |
| 4,086,474 | 4/1978 | Negi et al. | 364/757 |
| 4,096,566 | 6/1978 | Borie et al. | 364/200 |
| 4,158,233 | 6/1979 | Olander, Jr. et al. | 364/754 |
| 4,287,566 | 9/1981 | Culler | 364/200 |
| 4,325,116 | 4/1982 | Kranz et al. | 364/200 |
| 4,328,395 | 5/1982 | Henderson | 381/51 |
| 4,354,225 | 10/1982 | Frieder et al. | 364/200 |
| 4,434,461 | 2/1984 | Puhl | 364/200 |
| 4,441,201 | 4/1984 | Henderson et al. | 381/51 |

OTHER PUBLICATIONS

"High-Speed Parallel Multiplication", Digital System Modules Application Note, 1963.
Waser, "High-Speed Monolithic Multipliers for Real–Time Digital Signal Processing", *IEEE Computer*, Oct. 1978, pp. 19–29.
Parasuraman, "Hardware Multiplication Techniques for Microprocessor Systems", *Computer Design*, Apr. 1977, pp. 75–82.

Primary Examiner—James D. Thomas
Assistant Examiner—Dale M. Shaw
Attorney, Agent, or Firm—Eric W. Petraske

[57] ABSTRACT

An integrated-circuit CPU saves layout space by employing the Address Register as the Extension Register for multiplication operations, the Address Register being modified to include shifting hardware.

2 Claims, 4 Drawing Figures

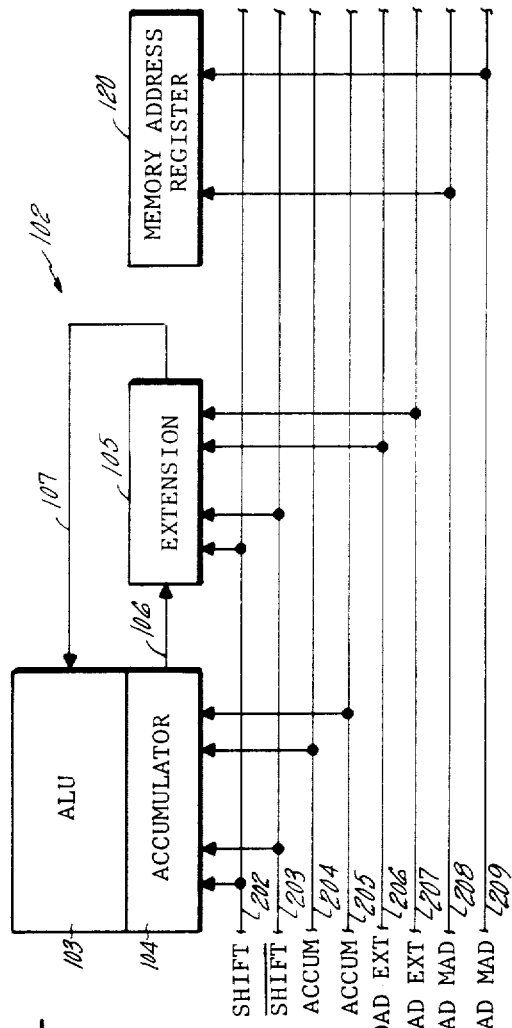
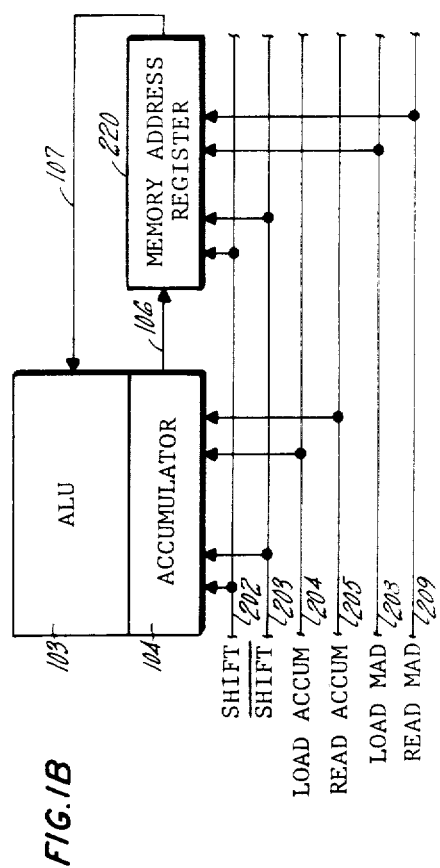
FIG. IA
PRIOR ART
FIG. IB

MULTIPLIER WITH HYBRID REGISTER

DESCRIPTION

1. Technical Field

The field of the invention is that of a digital computer having a CPU that is an integrated circuit.

2. Background Art

In binary multiplication, the multiplication of two N bit numbers produces a product having 2N bits. Different algorithms are used in the multiplication process in different computers, but all have a final shift register where the answer to the multiplication process is shifted as its quantity increases. This shift register must, of course, have a width of 2N bits in order to accommodate the greatest number that can be handled by a multiplier. Such a large register will take up silicon area and, on an integrated circuit chip, area is very scarce.

DISCLOSURE OF INVENTION

The problem of the excessive size of a binary multiplication unit within a CPU is solved by taking a general-purpose register which is positioned close to the multiplication unit and adding to it shifting hardware and controls, so that it temporarily becomes part of the final register of the multiplication unit.

BRIEF DESCRIPTION OF DRAWINGS

FIG. 1A illustrates a block diagram of a prior art multiplication unit.

FIG. 1B illustrates a block diagram of a multiplication unit constructed according to the invention.

BEST MODE FOR CARRYING OUT THE INVENTION

Figure 2A:
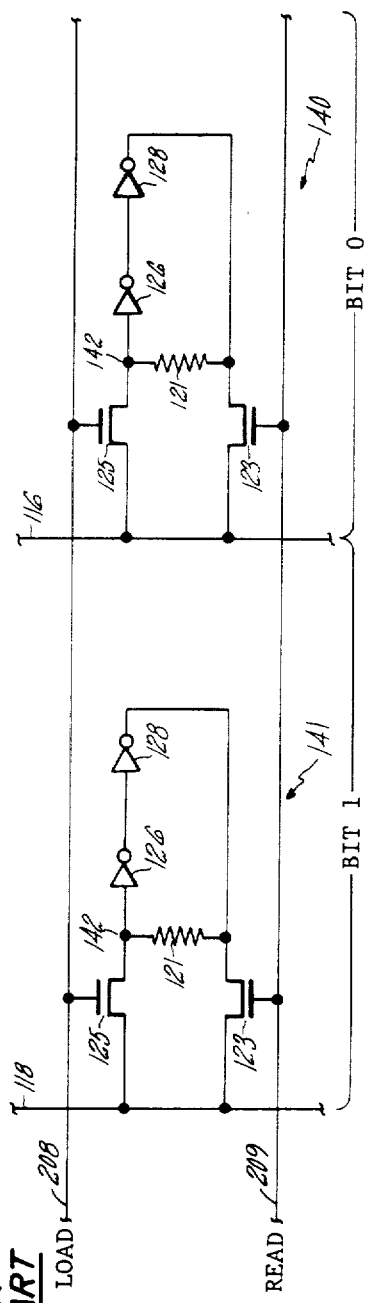
FIG. 2A illustrates a portion of a prior art memory address register.

FIG. 1A illustrates in partially schematic, partially pictorial form a prior art multiplication unit, indicated generally by the numeral 102 positioned close to a conventional address register 120. Block 103 represents the main portion of the multiplier and blocks 104 and 105 represent the accumulator and extension registers which store the product. At the start of a multiplication operation, the contents of accumulator 104 are set to zero and one of the operands (conventionally the multiplier) is loaded into extension register 105. During the operation, the operand is shifted in ALU 103 on line 107 and simultaneously bits are shifted from accumulator 104 over line 106 into extension register 105. At the end of the operation, the product is read out of accumulator 104 and register 105 onto a bus that is not shown for clarity.

SHIFT line 202, $\overline{\text{SHIFT}}$ line 203, LOAD ACCUMULATOR line 204, READ ACCUMULATOR line 205, LOAD EXTENSION line 206, READ EXTENSION line 207, LOAD Memory Address Register line 208 and READ Memory Address Register line 209 carry conventional commands that are evident from their labels.

FIG. 1B illustrates similarly a multiplier constructed according to the invention, in which elements that are the same as they were in FIG. 1A carry the same number. Extension register 105 has been eliminated and address register 220 performs the functions of both address register 120 and extension register 105 of FIG. 1A. Load and Read lines 206 and 207 have also been eliminated, their functions being performed by lines 208 and 209.

It can readily be seen from FIG. 1 that the area of silicon required by register 105 in the embodiment of FIG. 1A has been saved by a modified address register 220. The address register of the computer was selected to be used in connection with the multiplier because, during a multiplication operation, the address register is unused. Any other general-purpose register that is located conveniently close to the multiplication unit and is not needed during a multiplication operation could also be used.

FIG. 2A illustrates two cells of a prior art address register. The register may be extended in either the left or right direction to form any number of cells to accommodate whatever size word is used in a computer. Cell 140, on the right side of the drawing, is used to store the low order bit, bit 0 of the word. It is controlled by load line 208 and read line 209. If it is desired to load the register, load line 208 is brought high, turning on transistor 125. Binary data on line 116, the 0th bit line of the N bit word which is to be stored in the register, passes through transistor 125 into node 142. Inverters 126 and 128 respond to the level of node 142 to produce a voltage at the other end of resistor 121 connected between node 142 and the output of inverter 128-a voltage that is the same on both sides of resistor 121. During the load operation, transistor 123 is turned off by read line 209, which is low. The operation of cell 141, the second bit of the N bit word, is identical to that of cell 140. Data may be read out of the register by bringing read line 209 high. The voltage on resistor 121 passes through transistor 123 onto line 116.

Figure 2B:
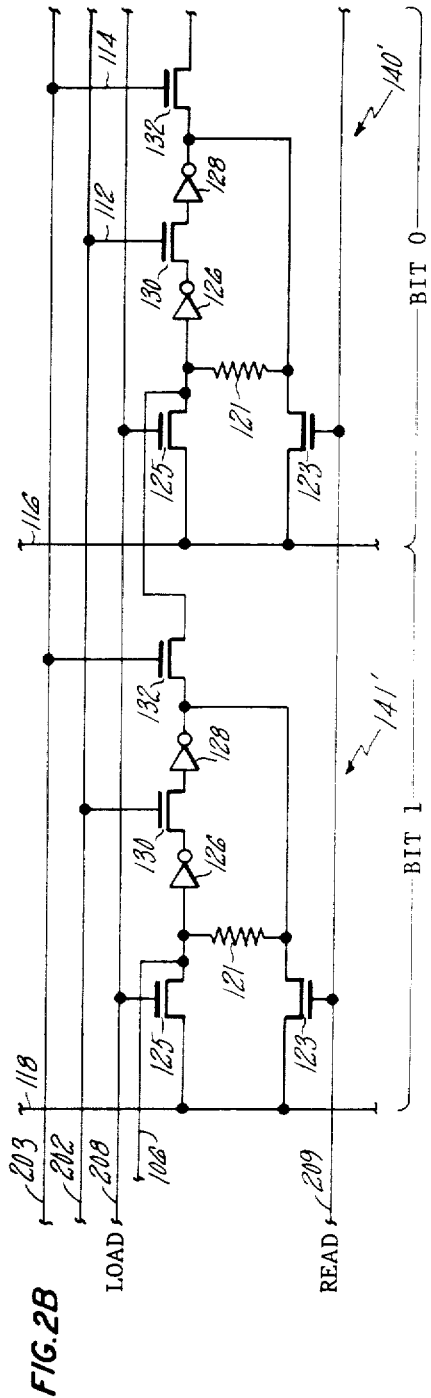
FIG. 2B illustrates a similar portion of a hybrid memory address register constructed according to the invention.

FIG. 2B illustrates schematically a hybrid address register constructed according to the invention, which differs from the address register of FIG. 2A in that shifting hardware has been added so that an individual cell within the address register may function as a conventional register cell or as a cell in a shift register. Read line 209 and load line 208 function as before, as do bit lines 116 and 118. Inverters 126 and 128 and resistor 121 and transistors 123 and 125 all function as before. New transistors 130 and 132 have been added. Transistors 132 connect the Nth cell with the N±1th cell to provide shifting between adjacent cells. The left-most cell is connected to line 106 so that a 32 bit register is formed by the combination of block 104 and 220. Transistor 130 provides the second shifting function, as in a conventional shift register, with lines 202 and 203 responding to staggered signals. Sequentially, transistor 130 is on and 132 is off. Then both are off, 132 is turned on with 130 off to shift the voltage at the output of inverter 128 to the input of inverter 126 of the next cell. Finally, both transistors are turned off.

In order to remove the product of the multiplication operation from the hybrid address register, the microcode transfers the contents of the address register to the bus in place of the extension register. When the multiplication operation is not taking place, line 203 is low, isolating the cells from one another and line 202 is high so that register 220 functions as a normal address register.

The invention does not depend on any particular microcode for a multiplication algorithm or for controlling the address register, and those skilled in the art will readily be able to adapt the teaching of the invention to computer architecture other than that used in the embodiment shown. Also, control circuits for loading registers, performing the shift operation, storing the product are conventional and have been omitted from the discussion.

I claim:

1. An integrated-circuit central processing unit of a microcomputer comprising:

an arithmetic logic unit containing multiplier circuitry to perform a multiplication algorithm;

an accumulator register for storing a first portion of the product of a multiplication operation, an extension register for storing a second portion of the product of a multiplication operation, said extension register being connected to said accumulator register;

means for shifting binary data from said accumulator into said extension register;

means for shifting data within said extension register;

means for loading and reading data in parallel into and out of said extension register, characterized in that:

said extension register is replaced by a second register that performs a second function independent of said multiplication operation, in addition to shifting and storing said second portion of said product and performs said second function as a component of a CPU block external to said multiplier circuitry;

said means for shifting data is connected between said accumulator and said second register; and said central processing unit includes means for loading and reading data in parallel into and out of said second register independently of the multiplication operation during periods when a multiplication operation is not in process.

2. A central processing unit according to claim 1, in which said second register is the address register of said microcomputer and said means for loading and reading data into and out of said second register operates cooperatively with said central processing unit circuitry to store addresses during periods when said multiplier circuitry is idle.

* * * * *